United States Patent [19]

Shimizu

[11] 4,294,336
[45] Oct. 13, 1981

[54] DISC BRAKE

[75] Inventor: Kazuaki Shimizu, Fujisawa, Japan

[73] Assignee: Nissan Motor Company, Limited, Yokohama, Japan

[21] Appl. No.: 20,624

[22] Filed: Mar. 15, 1979

[30] Foreign Application Priority Data

Mar. 30, 1978 [JP] Japan .................... 53-37122

[51] Int. Cl.³ .............................................. F16D 65/20
[52] U.S. Cl. ..................................... 188/72.4; 188/367
[58] Field of Search .................... 188/72.4, 72.5, 363, 188/364, 367, 368; 92/181 R, 184

[56] References Cited

U.S. PATENT DOCUMENTS

| | | | |
|---|---|---|---|
| 2,497,438 | 2/1950 | Butler | 188/72.4 X |
| 3,160,371 | 12/1964 | Doolittle | 188/72.4 X |
| 3,194,351 | 7/1965 | Swift | 188/72.4 |
| 3,442,356 | 5/1969 | Hahm | 188/72.4 |
| 3,951,241 | 4/1976 | Baxendale | 188/72.4 |
| 4,072,214 | 2/1978 | Haraikawa et al. | 188/72.4 |

Primary Examiner—Duane A. Reger

[57] ABSTRACT

An enclosed space which constitutes part of an operating chamber of a cylinder is left between a piston and the bottom of the cylinder or between a piston and another piston when the piston is brought into contact with the bottom or the other piston. At least one groove or recess is formed in either the piston or the bottom, or in either the piston or the other piston so that communication between the enclosed space and a fluid port of the cylinder is not blocked even when the piston is brought into contact with the bottom or the other piston.

7 Claims, 9 Drawing Figures

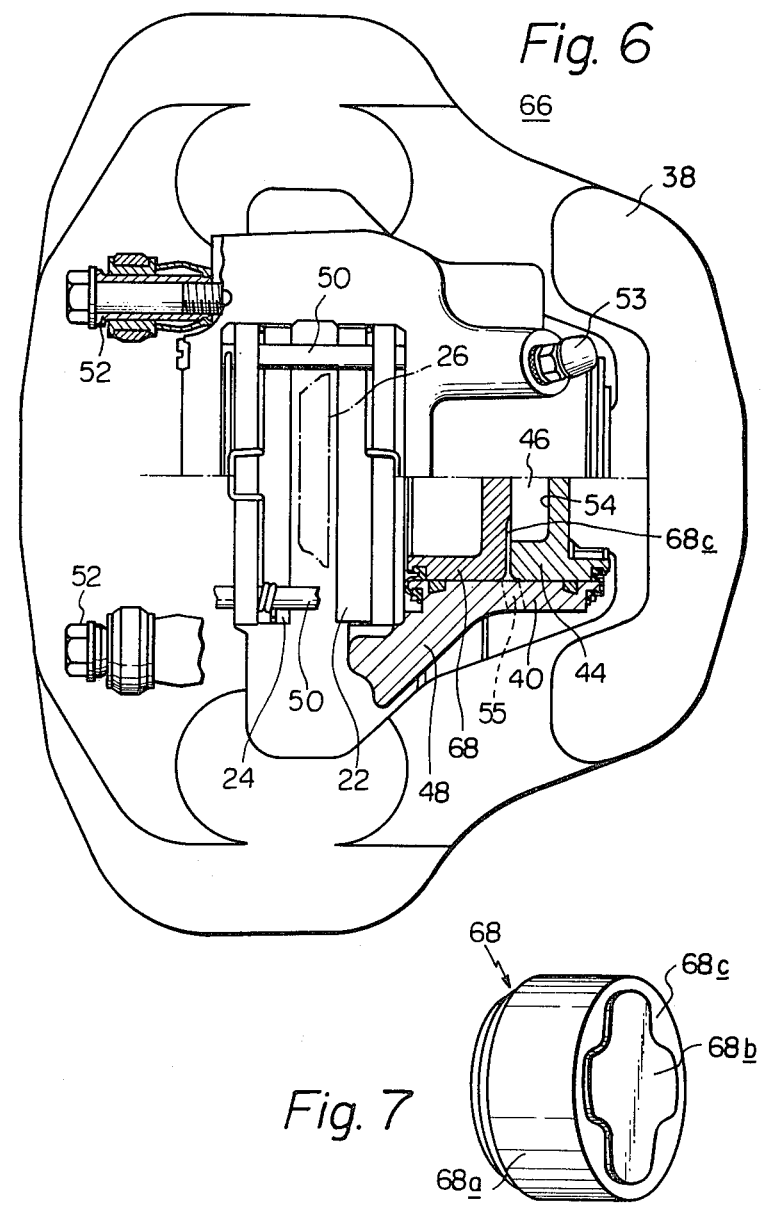

DISC BRAKE

FIELD OF THE INVENTION

The present invention relates in general to a disc brake, more particularly to a disc brake which is designed to completely discharge air from the operating chamber formed in a cylinder thereof when charging of an operating fluid into the chamber is required.

BACKGROUND OF THE INVENTION

It is known in the art to supply the operating chamber of the cylinder of the disc brake with vacuum to discharge air therefrom when charging of an operating fluid into the chamber is required. However, by the nature of the construction of the cylinder and pistons disposed in the cylinder, it is very difficult to completely discharge air from the operating chamber even when such vacuum supplying method is employed. Thus, it sometimes happens that air bubbles remain in the operating fluid in the operating chamber. Existence of such air bubbles in the chamber causes unstable and dangerous operation of the disc brake as is well known.

OBJECTS OF THE INVENTION

Therefore, an object of the present invention is to provide a disc brake which is free of the above-mentioned drawback.

It is another object of the invention to provide a disc brake which is characterized by its simple construction.

SUMMARY OF THE DRAWINGS

Other objects and advantages of the present invention will become apparent from the following description when taken in conjunction with the accompanying drawings, in which:

FIG. 6 is a partially cut away plan view of a third preferred embodiment of a disc brake according to the invention;

FIG. 7 is a perspective view of an inner piston used in the disc brake of FIG. 6;

DESCRIPTION OF PRIOR ART

Prior to describing the embodiments of the invention, an explanation of two conventionally used disc brakes will be given with reference to FIGS. 1 and 2 of the accompanying drawings in order to clarify the invention.

Figure 1:
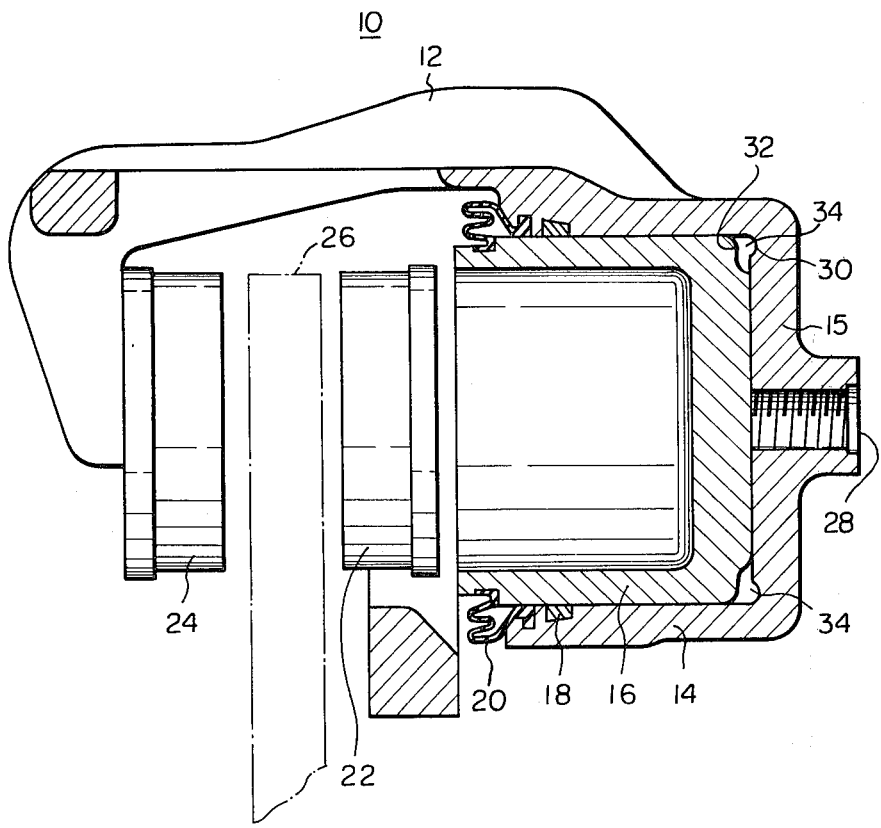
FIG. 1 is a sectional view of a conventional disc brake including one piston.

In FIG. 1, a conventional one-piston type disc brake 10 is shown, which generally comprises a calliper 12, a cylinder 14 with a closed end 15 and integral with the calliper 12, a piston 16 sealingly and slidably disposed in the cylinder 14, a sealing member 18 mounted in the inner wall of the cylinder 14, a flexible cover 20 extending from the open end of the piston 16 to the entrance of the cylinder 14, a pad 22 directly actuated by the piston 16 and another pad 24 actuated by the calliper 12. A disc 26 attached to a hub (not shown) of a road wheel is disposed at the peripheral section thereof between the pads 22 and 24 so that the disc 26 is braked by the pads 22 and 24 when operating fluid is fed, through a fluid port 28 formed in the cylinder 14, into an operating chamber defined between the bottom of cylinder 14 and the closed end of the piston 16. In this type disc brake 10, it inevitably occurs, by the nature of its production process, that a circular groove 30 is left about the periphery of the cylinder bottom and a circular recess 32 is left about the shoulder portion of the closed end of the piston 16, so that when the piston 16 takes the shown position in which the closed end of the piston 16 is in contact with the bottom surface of the cylinder 14, an annular sealed space 34 having a considerable volume appears about the bottom surface of the cylinder 14, as shown. The appearance of such sealed space 34 in the cylinder 14 brings a difficulty in optimally charging the operating fluid into the operating chamber because even if vacuum is supplied to the operating chamber, the air remaining in the sealed space 34 cannot be discharged therefrom once the piston 16 is brought into contact with the bottom surface of the cylinder 14, so that air bubbles remain in the operating fluid in the chamber. This is very dangerous as has been mentioned before.

Figure 2:
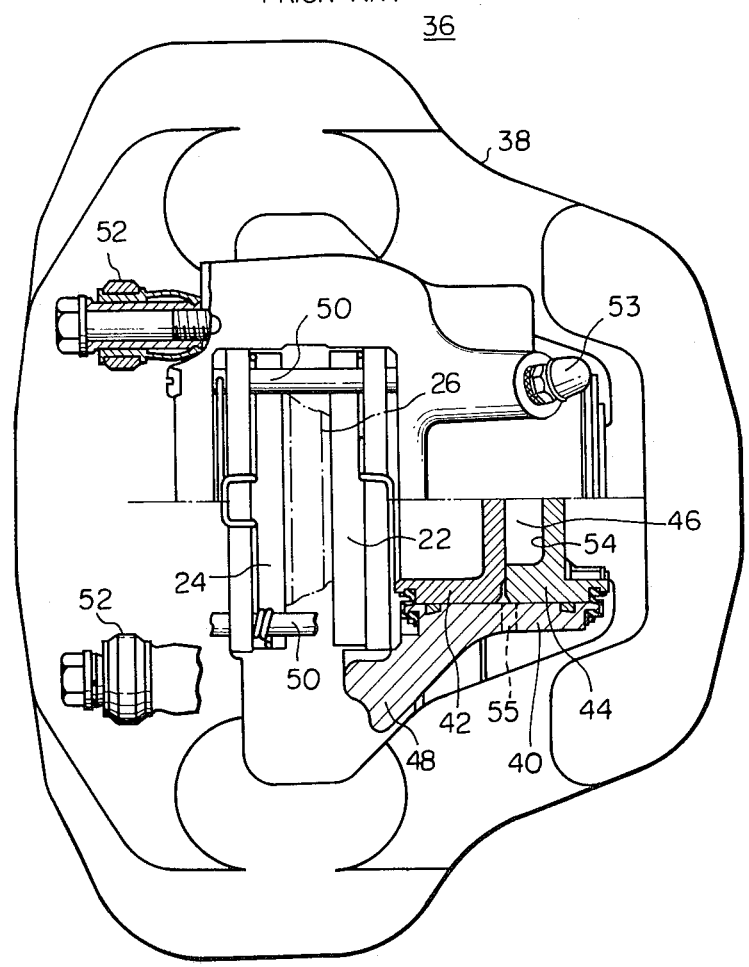
FIG. 2 is a sectional view of another conventional disc brake including two pistons.

In FIG. 2, a conventional two-piston type disc brake 36 is shown, which comprises a floating calliper 38, a cylinder 40, inner and outer pistons 42 and 44 sealingly and slidably disposed in the cylinder 40 to define therebetween an operating chamber 46, an arm structure 48 integral with the cylinder 40 and straddling the peripheral section of the disc 26, two parallel pins 50 supported by the arm structure 48, two pads 22 and 24 slidably supported by the pins 50 and respectively actuated by the inner piston 42 and the calliper 38, and two supporting and guiding members 52 connecting the calliper 38 and the arm structure 48. The outer piston 44 has therein a bore 54 which constitutes part of the operating chamber 46 as shown. Denoted by numeral 53 is a bleed screw. When an operating fluid under pressure is fed into the operating chamber 46 through a fluid port 55 formed in the cylinder 40, the inner and outer pistons 42 and 44 are moved to separate them from each other, that is in the directions leftward and rightward respectively in the drawing, urging the pads 22 and 24 to be brought into braking engagement with the disc 26 to brake the same. In this type disc brake, it sometimes occurs, by the nature of the construction of the pistons, that the bore 54 of the outer piston 44 is completely isolated or sealed from the fluid port 55 when the outer and inner pistons 42 and 44 are brought into contact with each other. This is undesirable by the reason mentioned before.

DESCRIPTION OF THE EMBODIMENTS

Therefore, an essential object of the present invention is to eliminate the above-mentioned drawbacks of the conventional disc brakes.

Figure 3:
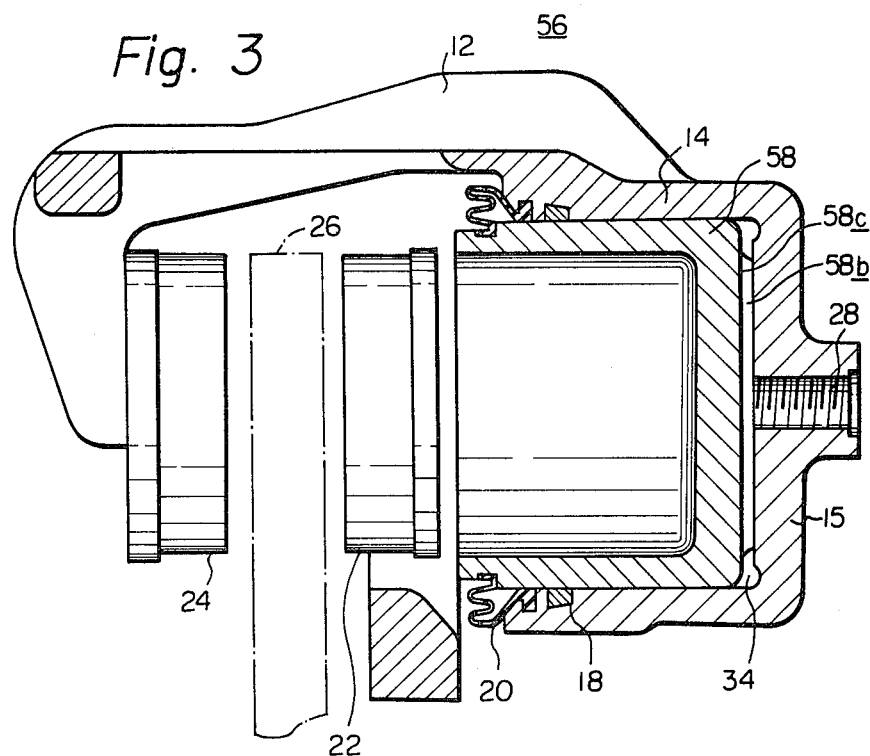
FIG. 3 is a sectional view of a first preferred embodiment of a disc brake according to the invention.
Figure 4:
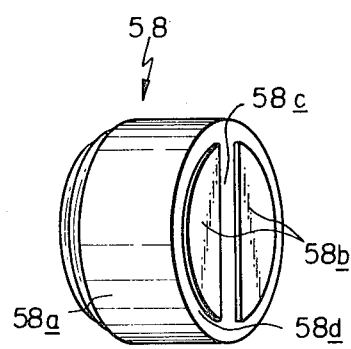
FIG. 4 is a perspective view of a piston which is used in the disc brake shown in FIG. 3.

Referring to FIGS. 3 and 4, there is illustrated a first preferred embodiment 56 according to the present invention. The first embodiment hereinshown is a one-piston type disc brake having a similar construction to that of FIG. 1 and comprises generally the same parts as in the case of the first conventional disc brake of FIG. 1. Thus, for facilitation of the drawing and description, such same parts will be designated by the same numerals as in FIG. 1 and the detailed explanation of which will be omitted from the following.

The only part which is different from that of FIG. 1 is a piston 58 which, as is well shown in FIG. 4, comprises a cylindrical main portion 58a and two crescent-shaped projections 58b integrally formed on a longitudinal closed end of the main portion 58a. As shown, the radius of curvature of each projection is smaller than that of the main portion 58a and the two projections 58b are separated to define therebetween a groove 58c and therearound a stepped portion 58d. Preferably, these two crescent-shaped projections 58b are arranged coaxial with the cylindrical main portion 58a. In assemblage, the piston 58 is such disposed in the cylinder 14 that at least a portion of the groove 58c faces the fluid port 28 to open the same.

With this construction, it will be appreciated that even when the piston 58 takes its rightmost position wherein the projections 58b are brought into contact with the bottom surface of the cylinder 14 as shown, communication between the annular space 34 and the fluid port 28 is kept by existence of the groove 58c. Thus, air discharging by the vacuum application method is completely done, so that the charging of the operating fluid into the operating chamber of the disc brake is optimally made without residual air.

Figure 5:
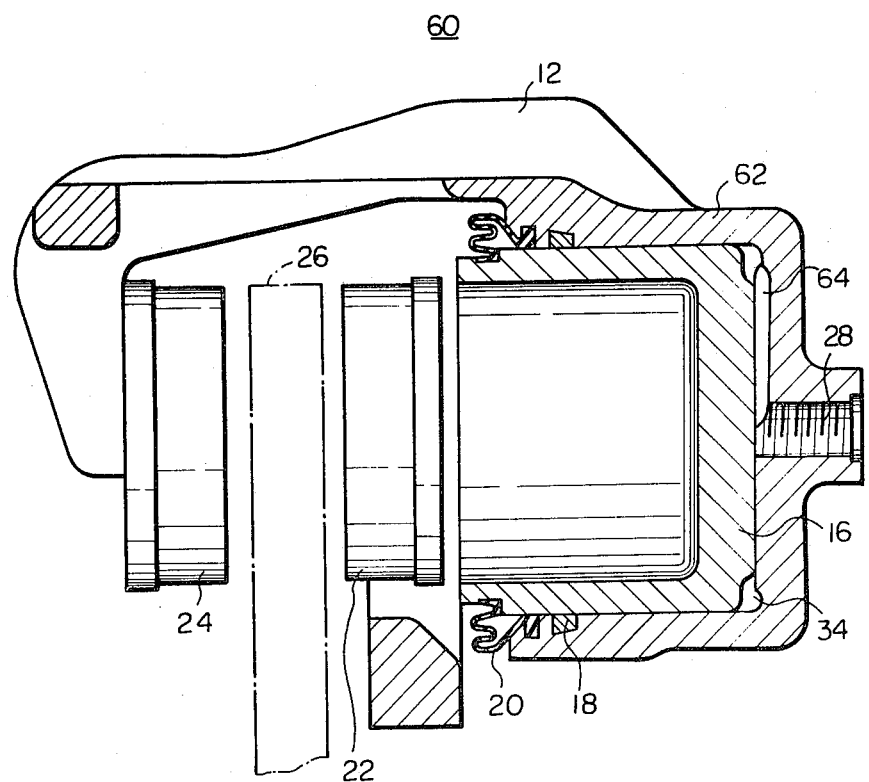
FIG. 5 is a view similar to FIG. 3 showing a second preferred embodiment of the invention.

Referring to FIG. 5, there is illustrated a second preferred embodiment of the invention, which is generally designated by numeral 60. The disc brake 60 of this embodiment is similar to that of FIG. 1 except for the construction of the cylinder. Thus similar parts will be designated by the same numerals as in the case of FIG. 1. The cylinder 62 according to the second embodiment is constructed to have in the bottom thereof at least one groove which extends from the fluid port 28 to the circular groove 30. Thus, communication between the annular space 34 and the port 28 is not blocked even when the closed end of the piston 16 is brought into contact with the bottom of the cylinder 62.

Referring to FIGS. 6 and 7, especially FIG. 6, there is shown a third preferred embodiment of the invention, which is a two-piston type disc brake 66. As shown, the disc brake 66 of this third embodiment is similar to that of FIG. 2 and comprises generally the same parts as in the case of the second conventional disc brake 36 of FIG. 2. Thus, for facilitation of drawing and description, generally the same parts will be designated by the same numerals as in the case of FIG. 2 and the detailed explanation will be omitted from the following.

The only part different from that of FIG. 2 is an inner piston 68. The inner piston 68 of this embodiment, as is well shown in FIG. 7, comprises a cylindrical main portion 68a and a cross-shaped projection 68b integrally formed on an outer surface of the longitudinal closed end of the main portion 68a. The size of the projection 68b is smaller than the cross-section of the main portion 68a thereby to form or define around the projection 68b a stepped portion 68c. As will be understood from FIG. 7, the projection 68b has four radially outwardly extending portions (no numerals) which are contactable with the open end of the outer piston 44, and the stepped portion 68c has four radially inwardly extending portions (no numerals) which are formed to communicate with the bore 54 of the outer piston 44 even when the projection 68b, more specifically the four radially outwardly extending portions thereof are brought into contact with the open end of the outer piston 44. In assemblage, the pistons 68 and 44 are such disposed in the cylinder 40 that at least a portion of the stepped portion 68c faces the fluid port 55 to open the same.

With this construction, it will be appreciated that since the bore 54 of the outer piston 44 is kept in communication with the fluid port 55 even when the pistons 68 and 44 are brought into contact with each other, air discharging by the vacuum applying method is optimally made, thus assuring the charging of the operating fluid into the chamber 46.

Figure 8:
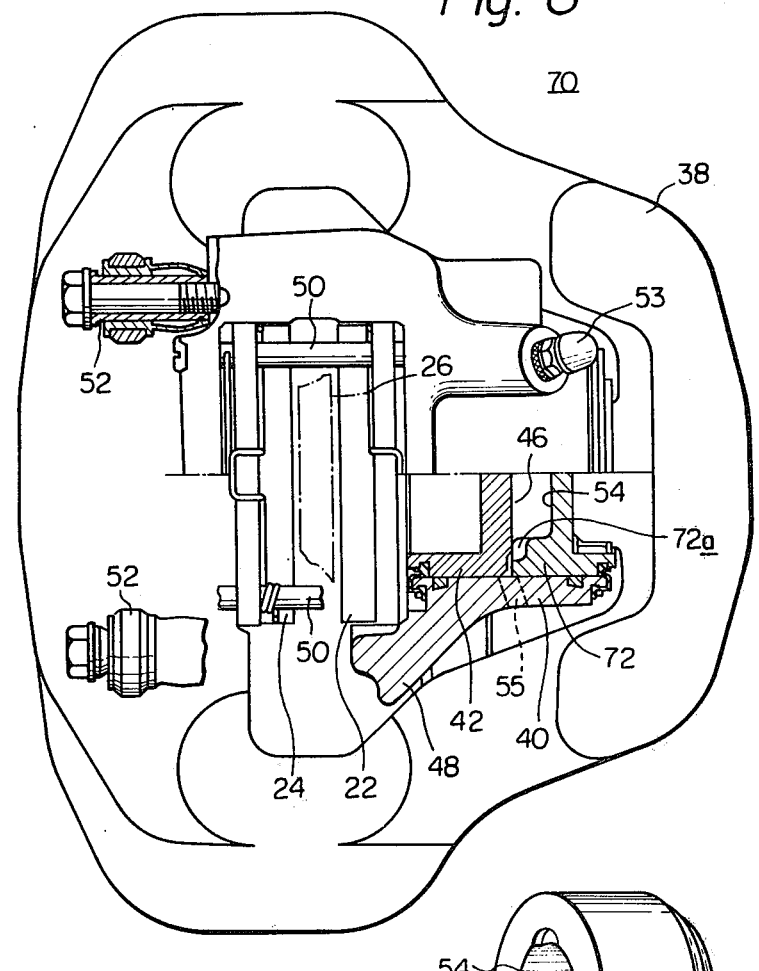
FIG. 8 is a view similar to FIG. 6 showing a fourth preferred embodiment of the invention.
Figure 9:
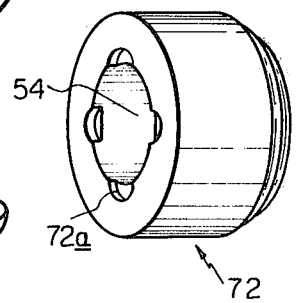
FIG. 9 is a perspective view of an outer piston used in the disc brake of FIG. 8.

Referring to FIGS. 8 and 9, especially FIG. 8, there is illustrated a fourth preferred embodiment of the invention, which is generally designated by numeral 70. The disc brake of this embodiment is similar to that of FIG. 2 except for the construction of the outer piston 72, and thus similar parts will be designated by the same numerals as in the case of FIG. 2. As is well shown in FIG. 9, the outer piston 72 of this embodiment is constructed to have four crescent-shaped recesses 72a at the open end thereof. Preferably, these recesses 72a are arranged at evenly spaced intervals, as shown. As will be seen from FIG. 8, each of the recesses 72a extends radially outwardly from the inner cylindrical surface of piston 72 to such a given amount of the same that even when the inner and outer pistons 42 and 72 are brought into contact with each other as shown, the bore 54 of the outer piston 72 is kept in communication with the opening 55 via the recesses 72a.

With the above, it will be appreciated that in the disc brake according to the invention, the enclosed space such as 34 or 54 is in communication with the fluid port 28 or 55 even when the piston (or pistons) takes the dormant position thereof, so that air discharging by the vacuum applying method is optimally made, thus assuring the charging of operating fluid into the operating chamber of the cylinder.

What is claimed is:

1. A disc brake comprising a cylinder means with opposed ends one of which is open and the other of which is closed, said cylinder means being formed at an inner surface of the closed end thereof with an annular groove which is located at the periphery of a circular bottom of said cylinder, cylindrical piston means slidably and sealingly disposed in said cylinder means to define in said cylinder means between said piston means and said closed end of said cylinder means an operating chamber into which an operating fluid is fed through a fluid inlet port formed in said closed end of said cylinder means, a first braking pad directly actuated by said piston means, a second braking pad actuated by said cylinder means through a calliper which is integral with said cylinder means, and a braking disc disposed between said first and second braking pads at the peripheral portion thereof, so that when a predetermined amount of operating fluid is introduced into said operating chamber to cause said piston means and said closed ends to be moved in opposite directions, said first and second braking pads are moved toward the opposed faces of said braking disc and finally brought into contact with the faces to grip said braking disc, wherein one of said cylinder means and said cylindrical piston means is integrally formed at its one end adjacent said closed end of said cylinder means with a groove which is arranged to communicate with both said annular groove and said fluid inlet port when said piston means is in contact with said closed end of said cylinder means.

2. A disc brake comprising a cylinder with opposed ends one of which is open and the other of which is closed, said cylinder being formed at an inner surface of the closed end thereof with an annular groove which is located at the periphery of a circular bottom of said cylinder, a cylindrical piston slidably and sealingly disposed in said cylinder to define in said cylinder between said piston and said closed end of said cylinder an operating chamber into which an operating fluid is fed through a fluid inlet port formed in said closed end of said cylinder, a first braking pad directly actuated by said piston, a second braking pad actuated by said cylinder through a calliper which is integral with said cylinder, and a braking disc disposed between said first and second braking pads at the peripheral portion thereof, so that when a predetermined amount of operating fluid is introduced into said operating chamber to cause said piston and said closed ends to be moved in opposite directions, said first and second braking pads are moved toward the opposed faces of said braking disc and finally brought into contact with the faces to grip said braking disc, wherein said piston is integrally formed at its one end facing said closed end of said cylinder with one or more projections which are arranged to form therein a groove and are arranged to form therearound a stepped portion which is merged with said groove, said piston being capable of taking a given position wherein said projections are in contact with said closed end of said cylinder while keeping communication between said groove and said fluid inlet port open.

3. A disc brake as claimed in claim 2, in which said fluid inlet port is located at a position facing said groove defined by said projections.

4. A disc brake as claimed in claim 3, in which each of said projections has a crescent-shaped configuration.

5. A disc brake comprising a cylinder having opposed open ends, inner and outer cylindrical piston means slidably and sealingly disposed in said cylinder to define therebetween an operating chamber into which an operating fluid is to be fed through a fluid inlet port formed in said cylinder, said outer piston means being formed with a blind bore which constitutes a part of said operating chamber, a first braking pad directly actuated by said inner piston means, a second braking pad actuated by said outer piston means through a calliper which is movable relative to said cylinder, and a braking disc disposed between said first and second braking pads at the peripheral portion thereof, so that when a predetermined amount of operating fluid is introduced into said operating chamber thereby moving said inner and outer piston means in opposite directions, said first and second braking pads are moved toward opposite faces of said disc and finally brought into contact with the faces to grip said disc, wherein one of said piston means is formed at its end adjacent said blind bore provided with a groove communicating with said blind bore and said fluid inlet part when said inner piston means is in contact with said open end of said outer piston means.

6. A disc brake comprising a cylinder having opposed open ends, inner and outer cylindrical pistons slidably and sealingly disposed in said cylinder to define therebetween an operating chamber into which an operating fluid is to be fed through a fluid inlet port formed in said cylinder, said outer piston being formed with a blind bore which constitutes a part of said operating chamber, a first braking pad directly actuated by said inner piston, a second braking pad actuated by said outer piston through a calliper which is movable relative to said cylinder, and a braking disc disposed between said first and second braking pads at the peripheral portion thereof, so that when a predetermined amount of operating fluid is introduced into said operating chamber thereby moving said inner and outer pistons in opposite directions, said first and second braking pads are moved toward opposite faces of said disc and finally brought into contact with the faces to grip said disc, wherein said inner piston is formed at its one end facing said blind bore of said outer piston with a projection which is arranged to form therearound a stepped portion, said inner piston being capable of taking a given position wherein the top of said projection is in contact with the open end of said outer piston while keeping communication between said blind bore of said outer piston and said fluid inlet port open.

7. A disc brake as claimed in claim 6, in which said projection on the inner piston is of cross-shaped configuration.

* * * * *